United States Patent
Persson et al.

(10) Patent No.: US 11,217,046 B2
(45) Date of Patent: Jan. 4, 2022

(54) SECURE DEVICE OPERATION USING TRANSFERRED CODE MODULES

(71) Applicant: Telefonaktiebolaget LM Ericsson (publ), Stockholm (SE)

(72) Inventors: Per Persson, Sodra Sandby (SE); Ola Angelsmark, Ystad (SE); Torgny Holmberg, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 767 days.

(21) Appl. No.: 16/069,636

(22) PCT Filed: Apr. 12, 2018

(86) PCT No.: PCT/EP2018/059466
§ 371 (c)(1),
(2) Date: Jul. 12, 2018

(87) PCT Pub. No.: WO2019/197032
PCT Pub. Date: Oct. 17, 2019

(65) Prior Publication Data
US 2021/0209874 A1    Jul. 8, 2021

(51) Int. Cl.
*G07C 9/00* (2020.01)
*G06F 21/31* (2013.01)
*G06F 21/51* (2013.01)

(52) U.S. Cl.
CPC ......... *G07C 9/00309* (2013.01); *G06F 21/31* (2013.01); *G06F 21/51* (2013.01);
(Continued)

(58) Field of Classification Search
CPC . G07C 9/00309; G07C 9/00817; G06F 21/31; G06F 21/51
(Continued)

(56) References Cited

U.S. PATENT DOCUMENTS

2014/0028438 A1* 1/2014 Kuenzi .............. G07C 9/00904
340/5.24
2014/0270127 A1 9/2014 Becker
(Continued)

FOREIGN PATENT DOCUMENTS

GN   105089373 A    11/2015
RU   2617250 C2     4/2017

OTHER PUBLICATIONS

PCT International Search Report, dated Dec. 14, 2018, in connection with International Application No. PCT/EP2018/059466, all pages.
(Continued)

*Primary Examiner* — Kerri L McNally

(57) ABSTRACT

A first device uses a first runtime environment executing on the first device to transfer a code module to a second runtime environment executing on a second device. The code module is configured to execute within the second runtime environment and expose a function of the second device that is supported by the second runtime environment to the first device. The first device executes an application within the first runtime environment. The application remotely invokes the function of the second device via the transferred code module and the second runtime environment.

12 Claims, 4 Drawing Sheets

(52) U.S. Cl.
CPC . *G07C 9/00817* (2013.01); *G07C 2009/0042* (2013.01); *G07C 2009/00825* (2013.01); *G07C 2009/00841* (2013.01)

(58) Field of Classification Search
USPC .......................................................... 340/5.2
See application file for complete search history.

(56) References Cited

U.S. PATENT DOCUMENTS

| | | | | |
|---|---|---|---|---|
| 2015/0082372 | A1* | 3/2015 | Kottahachchi | G06F 21/604 726/1 |
| 2015/0206367 | A1* | 7/2015 | Goldman | G07C 9/00571 340/5.61 |
| 2015/0371467 | A1* | 12/2015 | Wang | G07C 9/00309 340/5.26 |
| 2015/0371469 | A1* | 12/2015 | Scalisi | G07C 9/00563 340/5.52 |
| 2016/0036814 | A1* | 2/2016 | Conrad | H04L 63/0428 713/171 |
| 2016/0277925 | A1 | 9/2016 | Bengtsson et al. | |
| 2017/0018130 | A1* | 1/2017 | Robinson | G07C 9/38 |
| 2017/0213406 | A1* | 7/2017 | Fares | G07C 9/00857 |
| 2017/0365119 | A1* | 12/2017 | Yun | G07C 9/00571 |

OTHER PUBLICATIONS

PCT Written Opinion, dated Dec. 14, 2018, in connection with International Application No. PCT/EP2018/059466, all pages.
Russian Office Action dated Apr. 28, 2021 in connection with Russian Application No. 2020137076/28(068392), 10 pages.
English language translation of Russian Office Action dated Apr. 28, 2021 in connection with Russian Application No. 2020137076/28(068392), 8 pages.
Russian Search Report dated Apr. 27, 2021 in connection with Russian Application No. 2020137076/28(068392), 2 pages.
English language translation of Russian Search Report dated Apr. 27, 2021 in connection with Russian Application No. 2020137076/28(068392), 2 pages.
Ngu et al., "IoT Middleware: A Survey on Issues and Enabling Technologies", IEEE Internet of Thing Journal, Feb. 2017, pp. 1-20, vol. 4, No. 1, IEEE.
Persson et al., "Calvin—Meeting Cloud and IoT", Procedia Computer Science, 2015, 52, pp. 210-217, 6th International Conference on Ambient Systems, Networks and Technologies.

* cited by examiner

```
                                                           ┌─300
┌─────────────────────────────────────────────────────────────────────────────┐
│ USING A FIRST RUNTIME ENVIRONMENT EXECUTING ON THE FIRST DEVICE TO TRANSFER A│
│ CODE MODULE TO A SECOND RUNTIME ENVIRONMENT EXECUTING ON THE SECOND DEVICE,  │
│ WHEREIN THE CODE MODULE IS CONFIGURED TO EXECUTE WITHIN THE SECOND RUNTIME   │
│ ENVIRONMENT AND EXPOSE A FUNCTION OF THE SECOND DEVICE, SUPPORTED BY THE     │
│              SECOND RUNTIME ENVIRONMENT, TO THE FIRST DEVICE                 │
│                                    310                                       │
└─────────────────────────────────────────────────────────────────────────────┘
                                     │
                                     ▼
┌─────────────────────────────────────────────────────────────────────────────┐
│  EXECUTING AN APPLICATION WITHIN THE FIRST RUNTIME ENVIRONMENT, THE APPLICATION│
│  REMOTELY INVOKING THE FUNCTION OF THE SECOND DEVICE VIA THE TRANSFERRED CODE │
│                 MODULE AND THE SECOND RUNTIME ENVIRONMENT                    │
│                                    320                                       │
└─────────────────────────────────────────────────────────────────────────────┘
```

FIG. 3

```
                                                           ┌─400
┌─────────────────────────────────────────────────────────────────────────────┐
│ TRANSFERRING A CODE MODULE, FROM A FIRST RUNTIME ENVIRONMENT EXECUTING ON    │
│ THE FIRST DEVICE, TO A SECOND RUNTIME ENVIRONMENT EXECUTING ON THE SECOND    │
│ DEVICE TO EXPOSE A FUNCTION OF THE SECOND DEVICE SUPPORTED BY THE SECOND     │
│                RUNTIME ENVIRONMENT TO THE FIRST DEVICE                       │
│                                    410                                       │
└─────────────────────────────────────────────────────────────────────────────┘
                                     │
                                     ▼
┌─────────────────────────────────────────────────────────────────────────────┐
│     USING THE SECOND RUNTIME ENVIRONMENT TO CONTROL PERFORMANCE OF THE       │
│    FUNCTION OF THE SECOND DEVICE RESPONSIVE TO A REMOTE INVOCATION OF THE    │
│ FUNCTION RECEIVED VIA THE CODE MODULE FROM AN APPLICATION EXECUTING WITHIN THE│
│                         FIRST RUNTIME ENVIRONMENT                            │
│                                    420                                       │
└─────────────────────────────────────────────────────────────────────────────┘
```

FIG. 4

SECURE DEVICE OPERATION USING TRANSFERRED CODE MODULES

TECHNICAL FIELD

Embodiments of the present disclosure generally relate to device security, and more particularly relate to transferring a code module between the runtime environments of respective devices to securely access device functionality.

BACKGROUND

It is common for devices to communicate with each other in order to perform tasks, e.g., over a network. To make use of the functions of a device, whether locally or over the network, a user must typically authenticate with that device. Once authenticated, the user is then able to use the device to perform one or more functions.

Authentication is often performed by providing certain credentials recognized by the device. For example, a user may provide a password, or an application may provide a digital key. If the password or key are stolen or forged, the security of the device may be compromised. Once such a device is compromised, any number of its functions may be exploited. In general, the increasing sophistication of malicious users has created a continuing pressure on developers to devise new and better techniques for securing devices.

SUMMARY

Embodiments of the present disclosure invoke device functions differently than traditional approaches. As just one example, a smart lock executes a runtime environment that supports an unlocking function. To gain access to the unlocking function, another device (e.g., a user's smart phone) obtains authorization to transfer a code module to the smart lock. The code module is configured to execute within the smart lock's runtime environment and expose the unlocking function to the user's smart phone (e.g., via wireless communication). Once the unlocking function is exposed to the user's device, an application running within the runtime environment on the user's device can invoke the unlocking function via the code module.

According to particular embodiments, such a system is resilient against intrusion. For example, even if the above-discussed smart lock is compromised in some way, without the code module, there may be no way to readily invoke the unlocking function. Additionally or alternatively, malicious software agents downloaded to the user's device may be unable to intercept the credentials exchanged between the smart lock and user device runtime environments. Other advantages will discussed below, or will be apparent to those skilled in the relevant arts, along with other embodiments in which a first device makes use of a second device.

Consistent with the above, particular embodiments include a method, implemented by a first device, of using a second device. The method comprises using a first runtime environment executing on the first device to transfer a code module to a second runtime environment executing on the second device. The code module is configured to execute within the second runtime environment and expose a function of the second device, supported by the second runtime environment, to the first device. The method further comprises executing an application within the first runtime environment. The application remotely invokes the function of the second device via the transferred code module and the second runtime environment.

In some embodiments, the method further comprises authenticating the first runtime environment with the second runtime environment to obtain authorization to transfer the code module to the second runtime environment for execution within the second runtime environment.

In any of the preceding embodiments, the method further comprises communicating directly with the second runtime environment to invoke a different function of the second device.

In any of the preceding embodiments, the transfer of the code module to the second runtime environment is performed over a wireless point-to-point connection between the first device and the second device.

Other embodiments include a method, implemented by a second device, of providing a first device with access to a function of the second device. The method comprises transferring a code module, from a first runtime environment executing on the first device, to a second runtime environment executing on the second device to expose a function of the second device supported by the second runtime environment to the first device. The method further comprises using the second runtime environment to control performance of the function of the second device responsive to a remote invocation of the function received via the code module from an application executing within the first runtime environment.

In some embodiments, the method further comprises authenticating the first runtime environment with the second runtime environment to authorize the transferring of the code module to the second runtime environment for execution within the second runtime environment.

In any of the methods of the second device, the method further comprises using the second runtime environment to control performance of a different function of the second device responsive to a direct communication from the first device to the second runtime environment.

In any of the methods of the second device, the transferring of the code module from the first runtime environment is performed over a wireless point-to-point connection between the first device and the second device.

In any of the preceding embodiments, the second device is an electronic lock and the function supported by the second runtime environment locks or unlocks the electronic lock.

Other embodiments include a device configured to perform any of the methods described above. In some embodiments the device comprises a processor and a memory, the memory containing instructions executable by the processor whereby the device is configured to perform the method. In some embodiments, the device comprises one or more physical units and/or functional modules for performing the method.

Other embodiments include a computer program comprising instructions which, when executed on at least one processor of a device, cause the at least one processor to carry out any of the methods described above.

Other embodiments include a carrier containing such a computer program. In some embodiments, the carrier is an electronic signal, optical signal, radio signal, or computer readable storage medium.

BRIEF DESCRIPTION OF THE DRAWINGS

FIG. 3 is a flow diagram illustrating an example method implemented by a first device according to one or more embodiments.

FIG. 4 is a flow diagram illustrating an example method implemented by a second device according to one or more embodiments.

DETAILED DESCRIPTION

Embodiments of the present disclosure include a code module that exposes a function of a device to another device. The code module is securely transferred via wireless communication between runtime environments so that the function may be remotely invoked. This transfer may be triggered by the devices coming within proximity of one another. Authorization to transfer the code module is handled between the runtime environments, such that the remote application need not support any particular security scheme used by the devices. The function may be inaccessible via remote invocation without the code module, and the code module may be deleted or returned after the function has been invoked and/or once the devices are no longer in proximity, e.g., to prevent other devices from invoking the function without authorization.

In some embodiments, the devices are part of a distributed Internet-of-Things (IoT) system. An example of such a system may be based on the Calvin application environment. In such a Calvin-based system, applications may be built from functional blocks (sometimes referred to as actors) that execute on runtimes that are tied to devices. According to embodiments, the actors may move between runtimes as needed in order to execute their functionality on particular devices.

Figure 1:
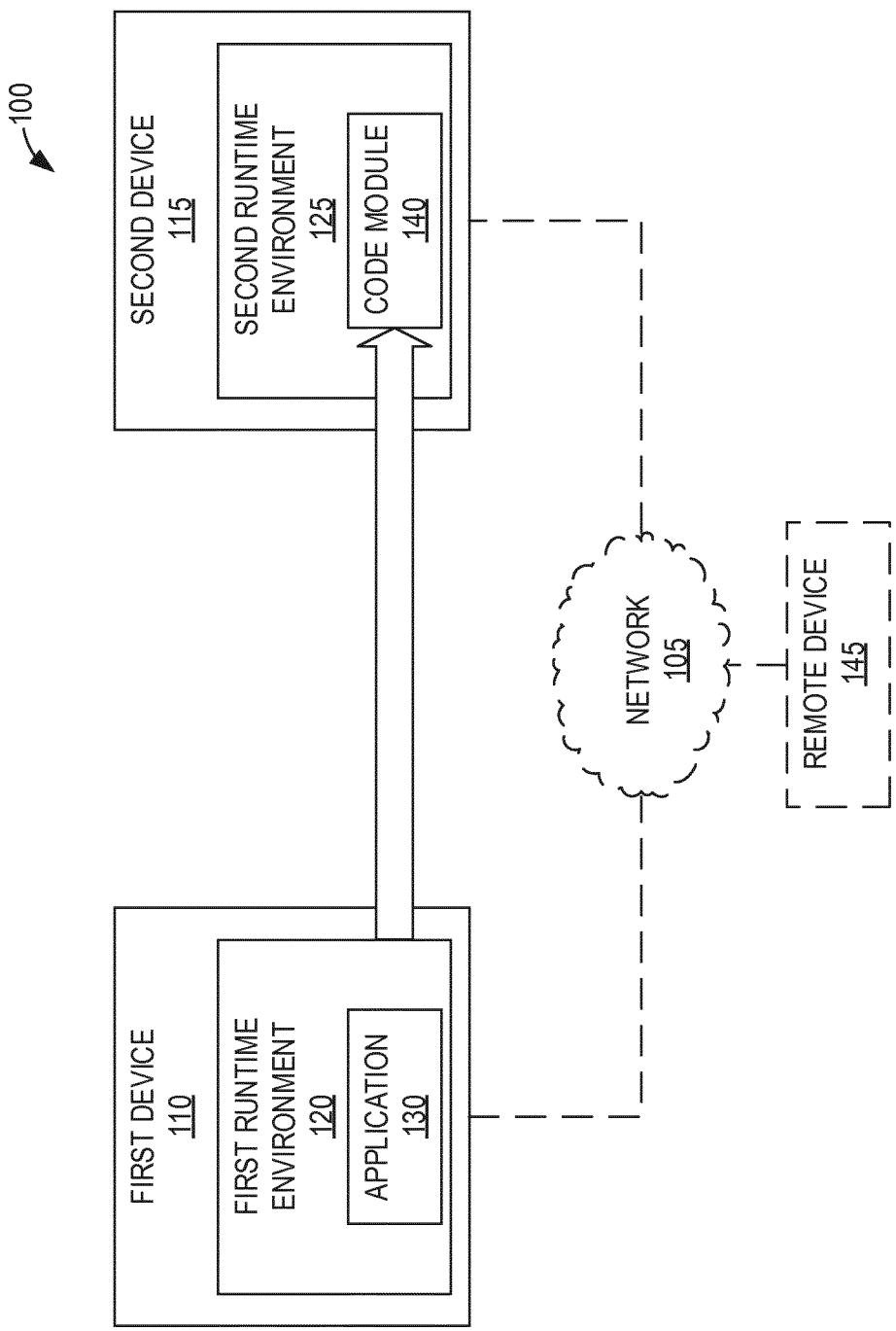
FIG. 1 is a block diagram illustrating an example network environment according to one or more embodiments.

FIG. 1 illustrates an example network environment 100 that includes a first device 110 and a second device 115. The first device 110 and the second device 115 are both communicatively connected to, and exchange signals with, each other (e.g., wirelessly, via a point-to-point connection). In some embodiments, the first device 110 and/or the second devices 115 are connected to a network 105 and configured to communicate via the network 105 with a remote device 145 and/or with each other. Accordingly, the first and second device 110, 115 may each support wired and/or wireless communication via one or more compatible technologies, e.g., near-field communication (NFC), Wi-Fi, BLUETOOTH, ZIGBEE, Long-Term Evolution (LTE), new radio (NR), Ethernet, and the like.

The first and second devices 110, 115 execute first and second runtime environments 120, 125, respectively. The first runtime environment 120 of the first device 110 is configured to transfer a code module 140 to the second runtime environment 125 of the second device 115, e.g., by controlling a wireless transmitter of the first device 110. Correspondingly, the second device 115 is configured to transfer the code module 140 from the first runtime environment 120 to the second runtime environment 125, e.g., by actively controlling a wireless receiver of the second device 115, or by passively allowing a memory of the second device 115 to be written to by the first device 110 (e.g., using a circuit that converts RF transmissions from the first device 110 into memory write instructions, such a circuit being powered, in some embodiments, by the RF energy of those transmissions).

The code module 140 is configured to execute within the second runtime environment 125 and expose a function of the second device 115, supported by the second runtime environment 125, to the first device 110. As will be discussed further below, an application 130 executing within the first runtime environment 120 of the first device 110 invokes the function of the second device 115 via the transferred code module 140 and the second runtime environment 125.

Typical examples of the first device 110 include (but are not limited to) a mobile device, such as a smartphone, a user equipment, a laptop computer, a tablet computer, and/or a wearable computer. Typical examples of the second device 115 include (but are not limited to) a computer and/or a smart appliance. Other examples of the first and second devices 110, 115 include other types of computing devices.

The network 105 includes one or more physical devices and/or signaling mediums capable of exchanging communication signals with the first and/or second devices 110, 115. Examples of such a network 105 include (but are not limited to) one or more of: the Internet (or a portion thereof); one or more local area networks; one or more wireless networks; one or more cellular networks; one or more Internet Protocol-based networks; one or more Ethernet networks; one or more optical networks; and/or one or more circuit switched networks. Such a network 105 may comprise any number of networking devices such as routers, gateways, switches, hubs, firewalls, and the like (not shown) supporting the exchange of such communication signals.

The remote device 145 may be any computing device communicatively coupled to the first and/or second device 110, 115 via the network 105. The remote device 145 may, for example, act as a first device 110 except in a different capacity. For example, the remote device 145 may be an administrator workstation that has secure access to the second device 115 via the network 105, e.g., via a physically secured or encrypted network connection to the second device 115. Accordingly, a user of the remote device 145 may be able to invoke the same and/or different functions of the second device 115 by also transferring a code module 140 to the second device and invoking particular functions, e.g., to assist a user of the first device 110. A typical example of the remote device 145 includes (but is not limited to) a workstation, personal computer, laptop computer, and/or tablet computer.

Figure 2:
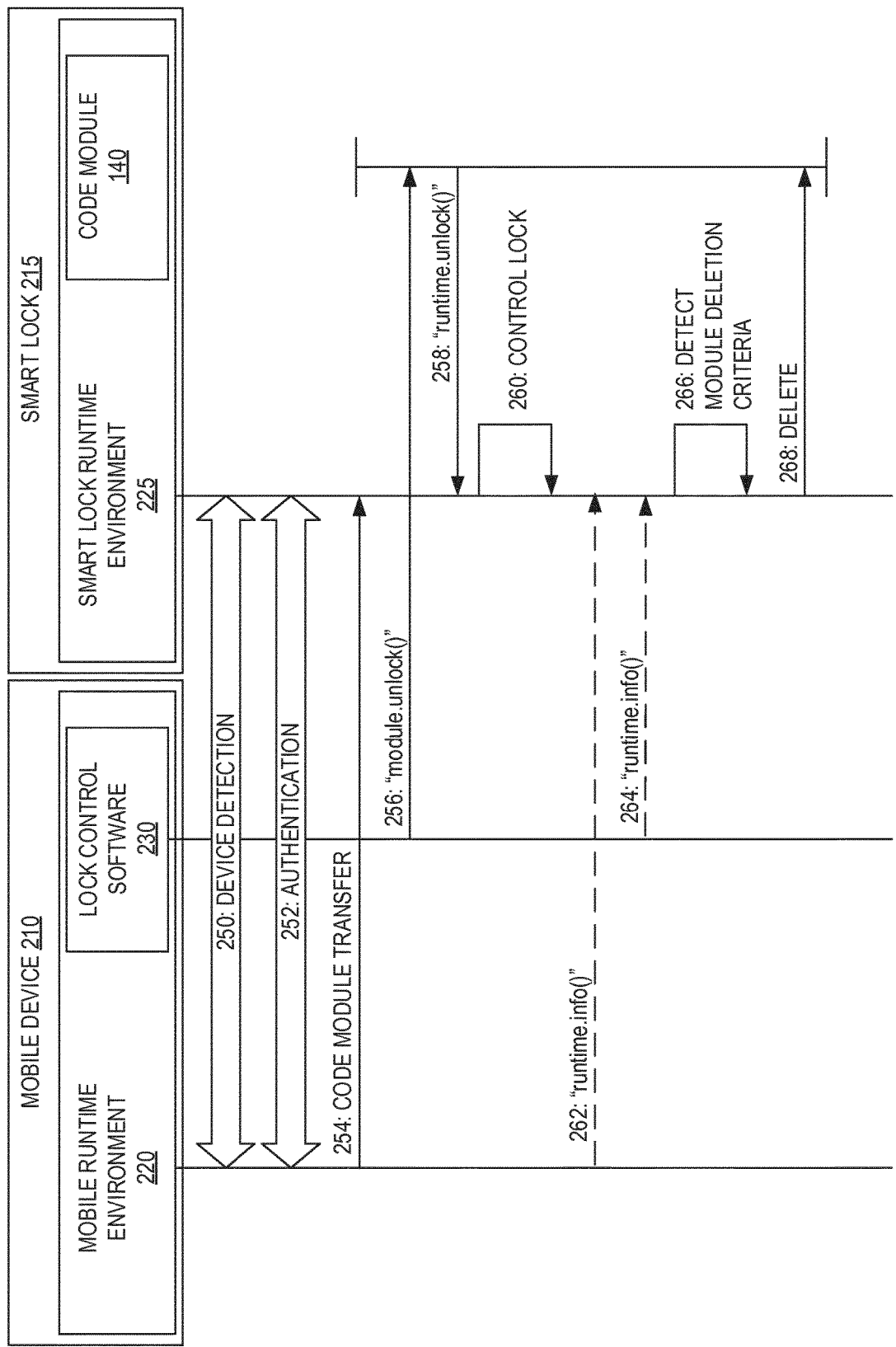
FIG. 2 is a call flow diagram illustrating example signaling between entities according to one or more embodiments.

FIG. 2 illustrates an example call flow between a mobile device 210 and a smart lock 215, consistent with aspects discussed above. In the example of FIG. 2, the mobile device 210 is an example of a first device 110, and the smart lock 215 is an example of a second device 115. Although FIG. 2 illustrates a particular example in which a mobile device 210 and smart lock 215 interact, alternative embodiments may include other devices acting as the first and/or second device 110, 115 to securely access other functions than those described below.

Consistent with the general discussion of FIG. 1, the mobile device 210 illustrated in FIG. 2 executes a mobile runtime environment 220. Lock control software 230 executes within the mobile runtime environment 220, e.g., as a service or responsive to being launched by a user of the mobile device 210. The smart lock 215 executes a smart lock runtime 225. The smart lock runtime 225 supports lock control operations, e.g., locking and unlocking the smart lock 215. However, the smart lock runtime 225 does not permit remote invocation of these operations without code module 140, which in this example is provided by the mobile device 210.

According to the example illustrated in FIG. 2, each of the mobile and smart lock runtime environments 220, 225 detect one another, e.g., by sensing radio frequency (RF) energy produced by the other device (step 250). In some embodiments, either or both of the devices 210, 215 may detect each other using additional or alternative proximity detection technology, e.g., optical and/or aural detection via corresponding sensors and/or receivers.

In response to detecting each other, the mobile and smart lock runtime environments 220, 225 participate in an authentication procedure (step 252). This authentication procedure may include the exchange of one or more credentials by which the smart lock runtime environment 225 may determine whether or not the mobile device 210 is permitted to use certain protected functions of the smart lock 215 (e.g., the unlock function). In particular, by performance of this authentication procedure may establish a trust relationship between the mobile and smart lock runtime environments 220, 225.

After successful authentication, the mobile runtime environment 220 transfers a code module 140 to the smart lock runtime environment 225 (step 254). The code module 140 is configured to execute within the smart lock runtime environment 225 and expose the unlock function of the smart lock 215 to the mobile device 210.

The lock control software 230 then invokes the unlock function of the smart lock 215 via the transferred code module 140, e.g., using an appropriate function call to an Application Programming Interface (API) of the code module 140, as represented in FIG. 2 by the function call "module.unlock( )" (step 256). Notably, the lock control software 230 is able to take advantage of the trust relationship established between the mobile and smart lock runtime environments 220, 225 in order to invoke the unlock function, with requiring the credentials upon which the trust relationship was established. This may be advantageous, e.g., in avoiding providing sensitive credentials to certain applications. In particular, embodiments may enable a user to freely download and use third-party and/or untrusted applications to invoke functions without concern that the applications will be able to obtain the credentials of either device 210, 215.

The code module 140 executes within the smart lock runtime environment 225 to handle the "module.unlock( )" function call by correspondingly invoking an API supported by the smart lock runtime environment, represented in FIG. 2 by the function call "runtime.unlock( )" (step 258). Thus, according to the embodiment illustrated in FIG. 2, the code module 140 may, among other things, serve as a translation layer between the lock control software 230 on the mobile device 210 and the smart lock runtime environment 225 that controls the unlocking function of the smart lock 215. In response to the unlock function call from the code module 140, the smart lock runtime environment 225 responds by controlling the smart lock 215 accordingly, i.e., by unlocking the smart lock 215 (step 260).

After the unlocking has been performed, the smart lock runtime environment 225 detects that one or more criteria for deleting the code module 140 have been satisfied (step 266). In this particular example, the code module 140 is not permitted to remain loaded on the smart lock 215 indefinitely. Accordingly, the smart lock runtime environment has one or more criteria for determining when the code module 140 is to be deleted. The criteria for deleting the code module 140 may include whether or not the mobile device 210 can be detected and/or whether or not a threshold period of time has passed since the code module 140 was transferred.

For example, while the code module 140 exists on the smart lock 215, the smart lock 215 may be vulnerable to some other device (not shown) invoking protected functions of the smart lock 215 via the code module 140, e.g., without authenticating and/or by spoofing characteristics of the mobile device 210. Accordingly, after a threshold period of time has passed since the code module 140 was transferred and/or if the mobile device 210 is no longer in proximity to the smart lock 215, the smart lock runtime environment 225 may determine that the code module 140 should be deleted. In particular, the smart lock runtime environment 225 may determine that the mobile device 210 has left the area around the smart lock 215 by failing to detect certain RF energy from the mobile device 210.

Having detected that certain module deletion criteria has been met, the smart lock runtime environment 225 deletes the code module 140 (step 268). In some embodiments, the smart lock runtime environment 225 also transfers the code module 140 back to the mobile device 210 (e.g., to the mobile runtime environment 220). Thus, in some embodiments, the code module 140 may act as a token that limits how the lock control software 230 is used. That is, while the code module 140 is transferred to the smart lock 215, the lock control software 230 may be prevented from sending a module.unlock( ) command to a different device, for example.

In some embodiments, the smart lock runtime environment 225 supports other functions that do not require the code module 140. Such functions may, for example, be public and/or read only functions that may be invoked without the need for authorization. Accordingly, in some embodiments, the mobile runtime environment 220 and/or the lock control software 230 may invoke functions of the smart lock 215 by communicating directly with the smart lock runtime environment 225. In the example of FIG. 2, this is illustrated by the mobile runtime environment 220 and lock control software 230 each invoking a "runtime.info( )" function call of the smart lock runtime environment 225 (steps 262, 264). Such a function call may, for example, return device status information about the smart lock 215. Such information may include device identity, owner identity, contact information for an administrator, whether the lock is locked or unlocked, and/or other information pertaining to the smart lock 215.

For example, a user of the mobile device 210 may encounter difficulty in attempting to unlock the smart lock 215. In such a scenario, the user may use the lock control software 230 to obtain information on how to contact an administrator who can use a remote device 145 to transfer a code module 140 to the smart lock runtime environment 225 and unlock the smart lock 215 themselves, or enable the user of the mobile device 210 to do it using their lock control software 230. One example of such an administrator may be a hotel manager, who can help guests having trouble using the system enter their rooms remotely, though there are myriad embodiments that may include other devices, contexts, and/or user roles.

It should further be noted that although the actions performed in steps 254, 256, 258, 262, and 264, and 268 are illustrated as being unidirectional actions, one or more of these steps may trigger a corresponding response in which a value is returned, e.g., to indicate a result of the illustrated action. For example, the smart lock runtime environment 225 may respond to the runtime.unlock( ) function call with a zero or non-zero value based respectively on whether or not the smart lock has successfully unlocked.

Consistent with the above, embodiments of the present disclosure include a method 300 of using a second device 115 implemented by a first device 110, such as the method 300 illustrated in FIG. 3. The method 300 comprises using a first runtime environment 120 executing on the first device 110 to transfer a code module 140 to a second runtime environment 125 executing on the second device 115 (block 310). The code module 140 is configured to execute within the second runtime environment 125 and expose a function of the second device 115, supported by the second runtime environment 125, to the first device 110. The method 300 further comprises executing an application 130 within the first runtime environment 120 (block 320). The application remotely invokes the function of the second device 115 via the transferred code module 140 and the second runtime environment 125.

Other embodiments include a method 400 of providing a first device 110 with access to a function of the second device 115 implemented by the second device 115. The method 400 comprises transferring a code module 140, from a first runtime environment 120 executing on the first device 110, to a second runtime environment 125 executing on the second device 115 to expose a function of the second device 115 supported by the second runtime environment 125 to the first device 110 (block 410). The method 400 further comprises using the second runtime environment 125 to control performance of the function of the second device 115 responsive to a remote invocation of the function received via the code module 140 from an application 130 executing within the first runtime environment 120 (block 420).

Figure 5:
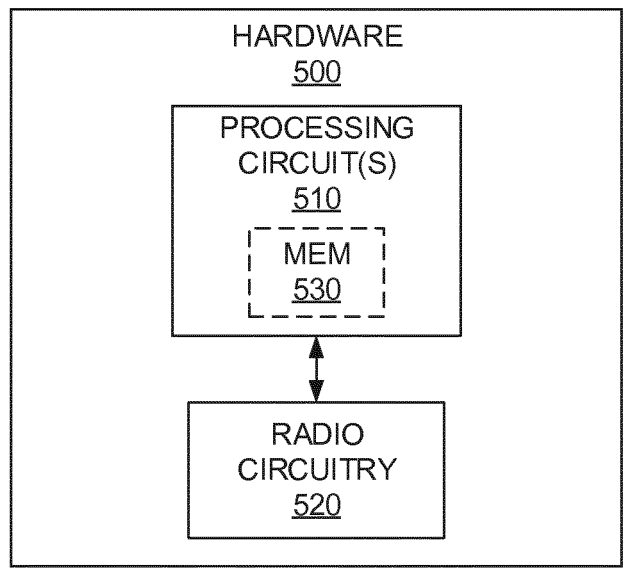
FIG. 5 is a block diagram illustrating example hardware according to one or more embodiments.

FIG. 5 illustrates hardware 500 suitable for implementing and/or supporting the first and/or second devices 110, 115, in accordance with one or more embodiments. As shown, the hardware 500 includes processing circuitry 510 and radio circuitry 520. The radio circuitry 520 may be configured to transmit and/or receive via one or more antennas (not shown) that are part of, or coupled to, the hardware 500. The processing circuitry 510 is configured to perform processing described above, e.g., in FIGS. 2 and/or 3, such as by executing instructions stored in memory 530. As will be discussed below, the processing circuitry 510 in this regard may comprise one or more physical units. Additionally or alternatively, the instructions stored in memory 530 may be comprised in one or more software modules.

Figure 6:
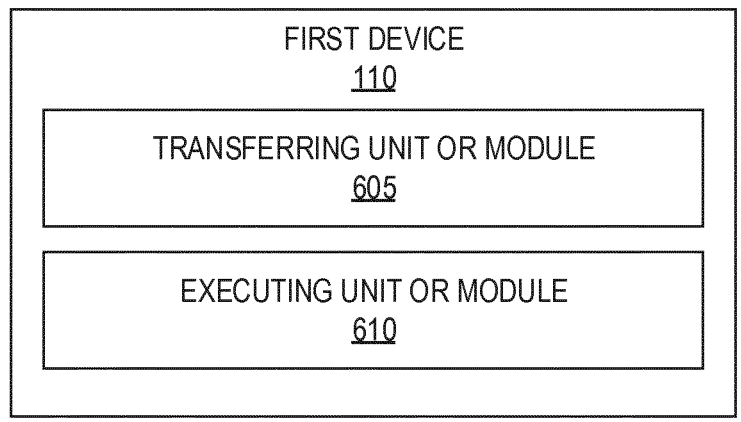
FIG. 6 is a block diagram illustrating an example first device according to one or more embodiments.

FIG. 6 in this regard illustrates additional details of a first device 110 in accordance with particular embodiments. Specifically, the first device 110 may include a transferring unit or module 605 and an executing unit or module 610. The transferring unit or module 605 may be configured to use a first runtime environment 120 executing on the first device 110 to transfer a code module 140 to a second runtime environment 125 executing on the second device 115. The code module 140 is configured to execute within the second runtime environment 125 and expose a function of the second device 115, supported by the second runtime environment 125, to the first device 110.

Figure 7:
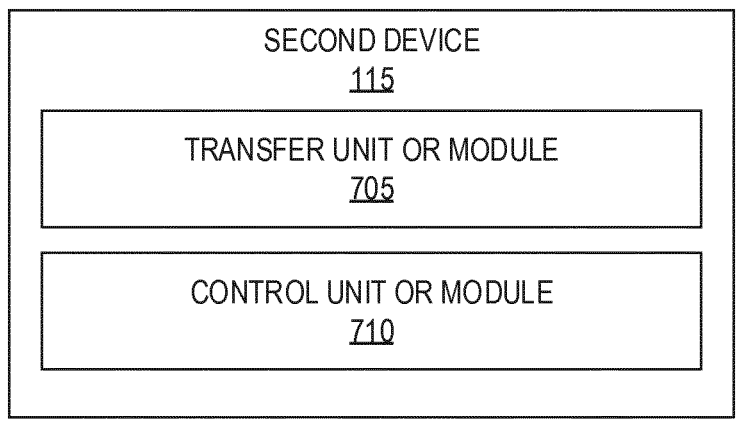
FIG. 7 is a block diagram illustrating an example second device according to one or more embodiments.

FIG. 7 illustrates additional details of a second device 115 in accordance with particular embodiments. Specifically, the second device 115 may include a transfer unit or module 705 and a control unit or module 710. The transfer unit or module may be configured to transfer a code module 140, from a first runtime environment 120 executing on the first device 110, to a second runtime environment 125 executing on the second device 115 to expose a function of the second device 115 supported by the second runtime environment 125 to the first device 110. The control unit or module 710 may be configured to use the second runtime environment 125 to control performance of the function of the second device 115 responsive to a remote invocation of the function received via the code module 140 from an application 130 executing within the first runtime environment 120.

In view of the above, aspects of the present disclosure may be implemented entirely as hardware units, entirely as software modules (including firmware, resident software, micro-code, etc.), or as a combination of hardware units and software modules. For example, embodiments of the present disclosure may take the form of a computing device with hardware and/or software components. Other embodiments may take the form of software executing on a processor of a computing device. Other embodiments may take the form of dedicated hardware configured to perform particular functions described herein. Other embodiments may take the form of a non-transitory computer readable medium storing software instructions in the form of a computer program that, when executed on a programmable device, configures the programmable device to execute the various methods described below.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, those skilled in the art will appreciate that the circuitry of various embodiments may be configured in ways that vary in certain details from the broad descriptions given above. For instance, one or more of the processing functionalities discussed above may be implemented using dedicated hardware, rather than a microprocessor configured with program instructions.

Embodiments of the present disclosure may additionally or alternatively include any compatible combination of features described herein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method, implemented by a first device, of using a second device, the method comprising:

authenticating a first runtime environment, executing on the first device, with a second runtime environment, executing on the second device, to obtain authorization to transfer a code module to the second runtime environment for execution within the second runtime environment;

using the first runtime environment to transfer the code module to the second runtime environment, wherein the code module is configured to execute within the second runtime environment and expose a function of the second device, supported by the second runtime environment, to the first device; and executing an application within the first runtime environment, the application remotely invoking the function of the second device via the transferred code module and the second runtime environment, wherein invoking the function of the second device comprises using a function call to an Application Programming Interface (API) of the transferred code module, and wherein the function call causes the transferred code module to initiate the function in the second runtime.

2. The method of claim 1, further comprising communicating directly with the second runtime environment to invoke a different function of the second device.

3. The method of claim 1, wherein the transfer of the code module to the second runtime environment is performed over a wireless point-to-point connection between the first device and the second device.

4. The method of claim 1, wherein the second device is an electronic lock and the function supported by the second runtime environment locks or unlocks the electronic lock.

5. A method, implemented by a second device, of providing a first device with access to a function of the second device, the method comprising:

authenticating a first runtime environment executing on the first device with the second runtime environment executing on the second device to authorize the transferring of a code module to the second runtime environment for execution within the second runtime environment, transferring the code module, from the first runtime environment, to the second runtime environment to expose a function of the second device supported by the second runtime environment to the first device; and using the second runtime environment to control performance of the function of the second device responsive to a remote invocation of the function received via the code module from an application executing within the first runtime environment, wherein the remote invocation of the function of the second device comprises a function call to an Application Programming Interface (API) of the transferred code module, and wherein the function call causes the transferred code module to initiate the function in the second runtime.

6. The method of claim 5, further comprising using the second runtime environment to control performance of a different function of the second device responsive to a direct communication from the first device to the second runtime environment.

7. The method of claim 5, wherein the transferring of the code module from the first runtime environment is performed over a wireless point-to-point connection between the first device and the second device.

8. The method of claim 5, wherein the second device is an electronic lock and the function supported by the first runtime environment locks or unlocks the electronic lock.

9. A first device for using a second device, the first device comprising:

a processor and a memory, the memory containing instructions executable by the processor whereby the first device is configured to:

authenticate a first runtime environment executing on the first device with a second runtime environment executing on the second device to obtain authorization to transfer the code module to the second runtime environment for execution within the second runtime environment;

use the first runtime environment to transfer the code module to the second runtime environment, wherein the code module is configured to execute within the second runtime environment and expose a function of the second device, supported by the second runtime environment, to the first device; and execute an application within the first runtime environment, the application remotely invoking the function of the second device via the transferred code module and the second runtime environment, wherein remotely invoking the function of the second device comprises using a function call to an Application Programming Interface (API) of the transferred code module, and wherein the function call causes the transferred code module to initiate the function in the second runtime.

10. A first device for using a second device, the first device configured to:

authenticate a first runtime environment executing on the first device with a second runtime environment executing on the second device to obtain authorization to transfer the code module to the second runtime environment for execution within the second runtime environment;

use the first runtime environment to transfer the code module to a second runtime environment, wherein the code module is configured to execute within the second runtime environment and expose a function of the second device, supported by the second runtime environment, to the first device; and execute an application within the first runtime environment, the application remotely invoking the function of the second device via the transferred code module and the second runtime environment, wherein invoking the function of the second device comprises using a function call to an Application Programming Interface (API) of the transferred code module, and wherein the function call causes the transferred code module to initiate the function in the second runtime.

11. A second device for providing a first device with access to a function of the second device, the second device comprising:

a processor and a memory, the memory containing instructions executable by the processor whereby the second device is configured to:

authenticate a first runtime environment executing on the first device with a second runtime environment executing on the second device to authorize the transferring of the code module to the second runtime environment for execution within the second runtime environment;

transfer the code module from the first runtime environment, to the second runtime environment to expose a function of the second device supported by the second runtime environment to the first device; and use the second runtime environment to control performance of the function of the second device responsive to a remote invocation of the function received via the code module from an application executing within the first runtime environment, wherein remotely invoking the function of the second device comprises using a function call to an Application Programming Interface (API) of the transferred code module, and wherein the function call causes the transferred code module to initiate the function in the second runtime.

12. A second device for providing a first device with access to a function of the second device, the second device configured to:
- authenticate a first runtime environment executing on the first device with a second runtime environment executing on the second device to authorize the transferring of a code module to the second runtime environment for execution within the second runtime environment;
- transfer the code module, from the first runtime environment, to the second runtime environment to expose a function of the second device supported by the second runtime environment to the first device; and
- use the second runtime environment to control performance of the function of the second device responsive to a remote invocation of the function received via the code module from an application executing within the first runtime environment, wherein invoking the function of the second device comprises a function call to an Application Programming Interface (API) of the transferred first code module, and wherein the function call causes the transferred code module to initiate the function in the second runtime.

\* \* \* \* \*